June 9, 1953          R. N. BENNETT          2,641,343
STEERING AND BRAKING MECHANISM FOR TRENCHERS
Filed Nov. 2, 1946          4 Sheets-Sheet 1
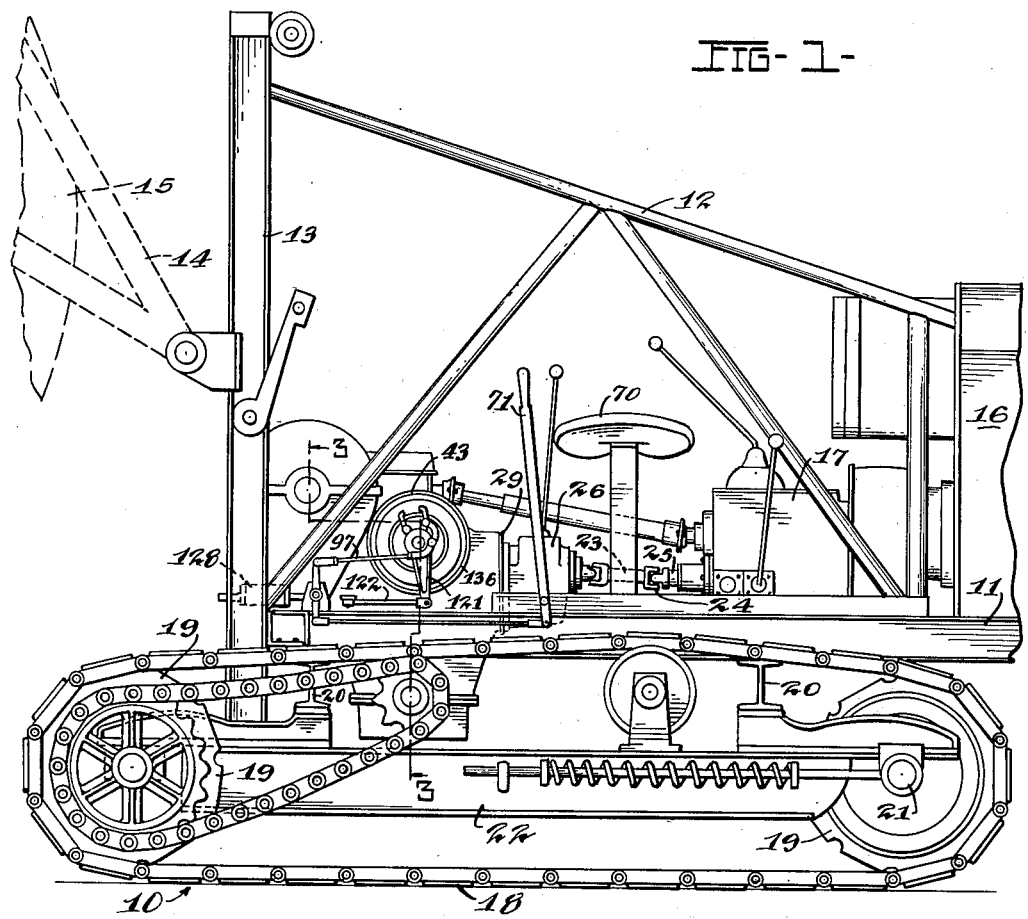
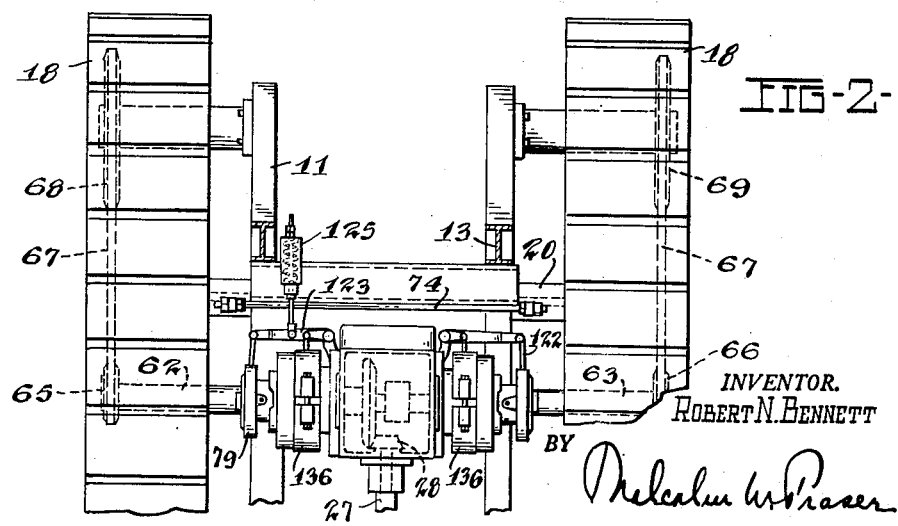
INVENTOR.
ROBERT N. BENNETT
BY
*Malcolm W. Fraser*
ATTY.

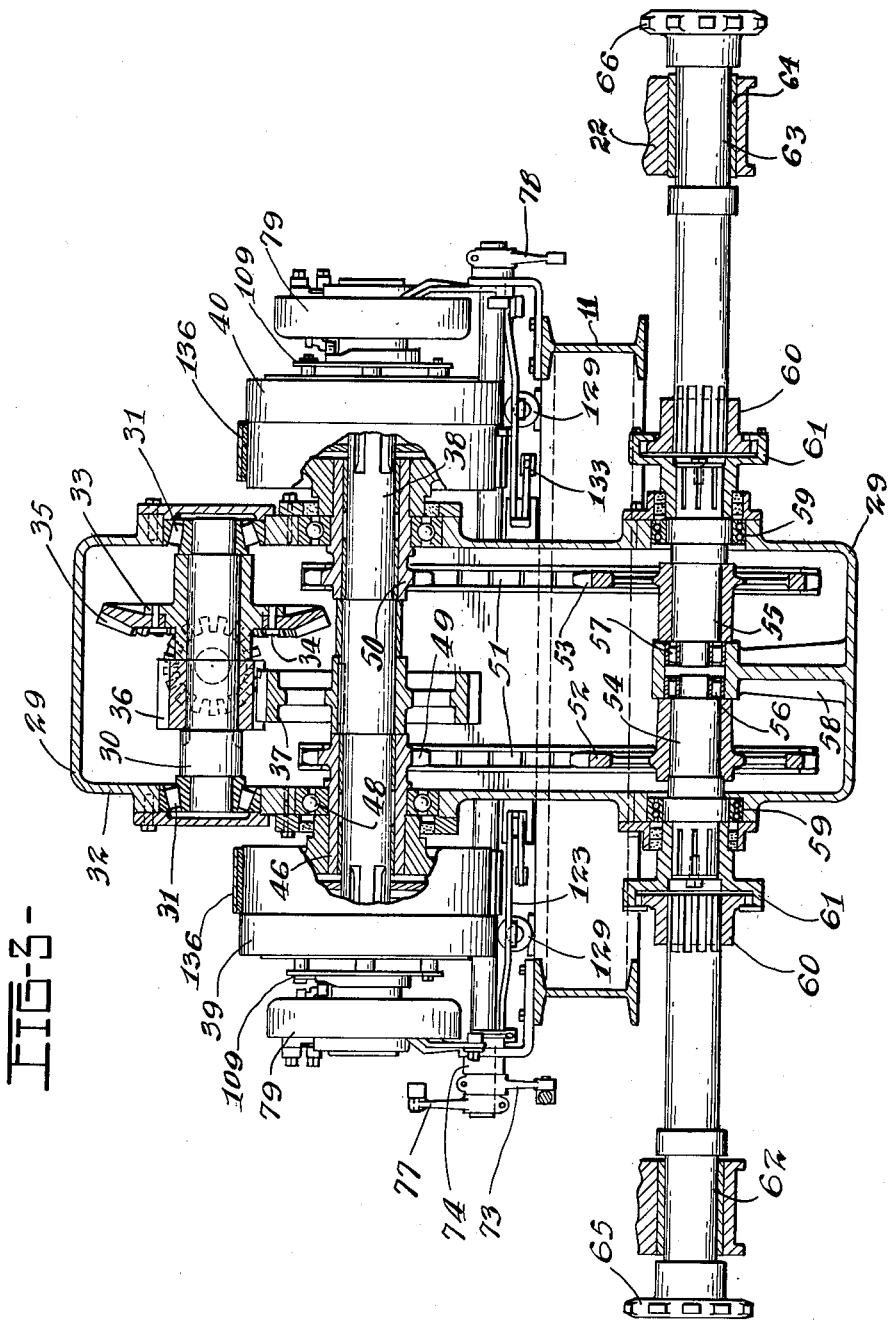

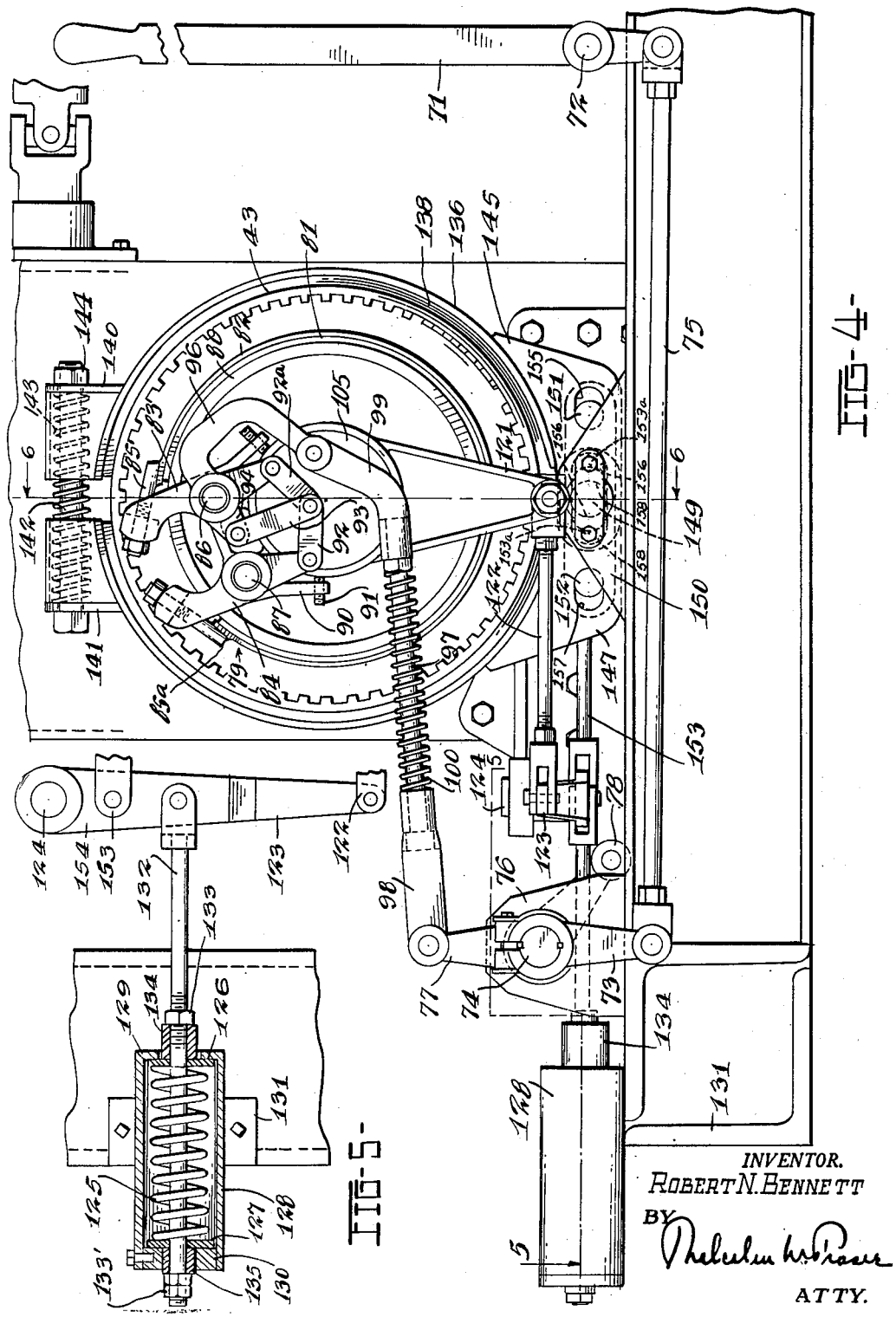

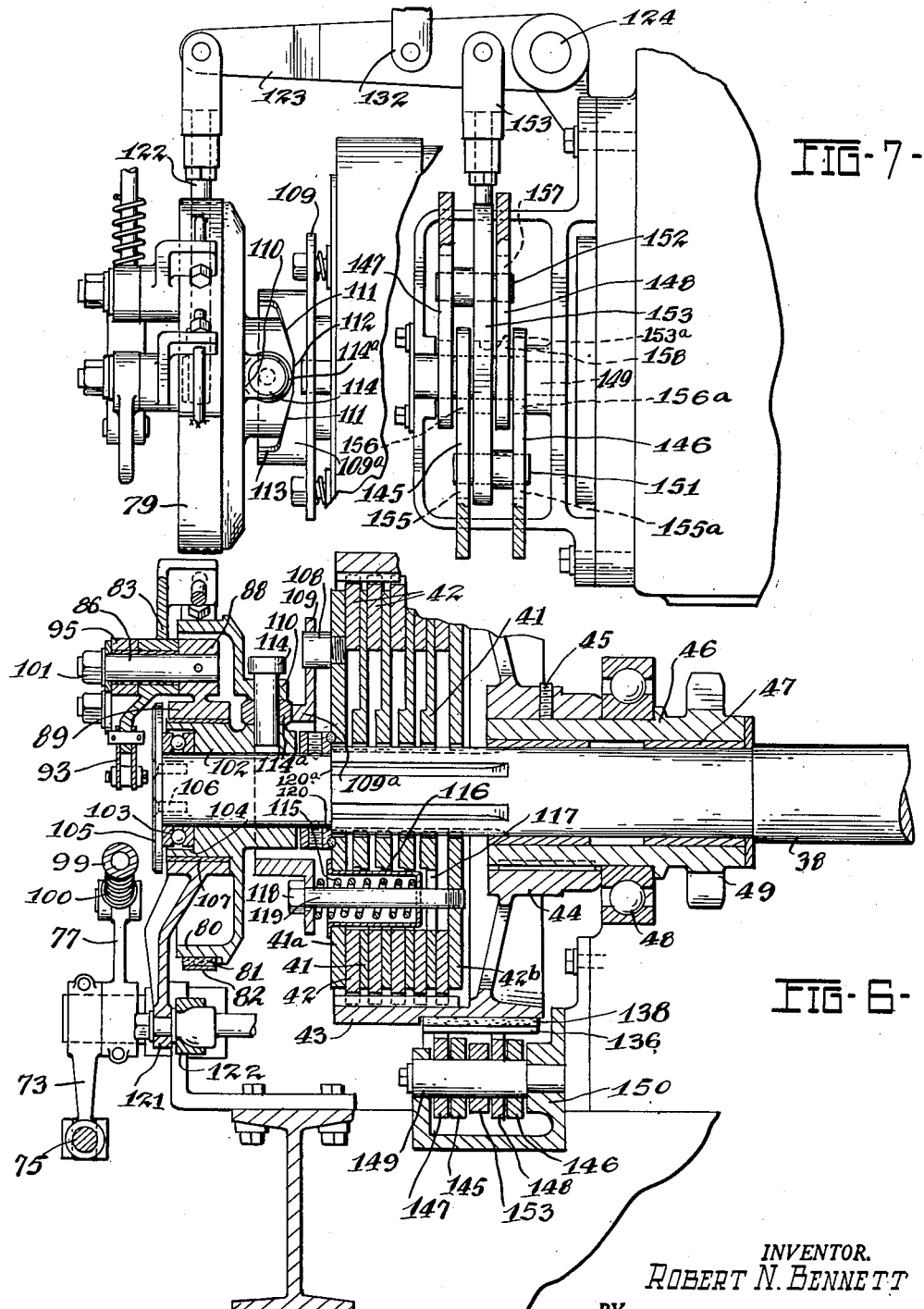

Patented June 9, 1953

2,641,343

UNITED STATES PATENT OFFICE 2,641,343

STEERING AND BRAKING MECHANISM FOR TRENCHERS

Robert N. Bennett, McComb, Ohio, assignor, by mesne assignments, to Gar Wood Industries, Inc., a corporation of Michigan Application November 2, 1946, Serial No. 707,399

7 Claims. (Cl. 192—13)

This invention relates to driving and steering mechanisms for controlling the movements of a tractor.

More particularly, the invention resides in the provision of mechanisms for driving and steering a vehicle of the type described, utilizing in connection with each separately mounted track, driving wheel, or other traction means a clutch and brake system interposed between the power source and the driving sprocket with suitable controls whereby the clutch and brake system may be used to effect either a direct driving connection with the traction means or else selectively to drive only one while braking the other to effect desired tractor turning movements.

An object of the invention is to produce a new and improved brake and steering clutch system in a final drive transmission interposed between the power source and the drive sprockets adapted progressively first partially to disengage the steering clutch and apply the brakes and then fully to disengage the steering clutch and apply the brakes, enabling more effective and efficient operation with less strain and wear on cooperating parts, thereby to enable simplification and more economical production of the desired units.

Another object is to produce a tractor braking and steering device having the parts disposed in an easily accessible manner enabling installation, repair, or replacement readily to be effected, the device being simple and compact in construction and efficient in operation.

A further object is to provide for tractors of the type described, a steering mechanism in which the movement of a driven part assists in the disengagement of the same driven part from selected driving parts and the application of frictional resistance to the further turning movement of the disengaged driving part using, for example, cooperable cam actuating means for spreading the engaging steering clutch plates and associated friction actuated means for applying the brakes.

These and other objects and advantages of this invention will become apparent from the following description and claims, and for purposes of illustration but not of limitation, an embodiment of the invention is shown on the accompanying drawings, in which:

Figure 1 is a diagrammatic side elevational view of a tractor of the track laying type used in connection with a digging wheel of a trenching machine;

Figure 2 is a fragmentary top plan view of the rear portion of the tractor, certain parts of the superstructure removed or shown in section in order to show the crawler drive mechanism;

Figure 3 is a detail sectional elevational view taken along the line 3—3 of Figure 1, showing the driving transmission mechanism;

Figure 4 is a detail side elevational view of the clutch and brake assembly and their actuating means;

Figure 5 is a sectional view taken along the line 5—5 of Figure 4, showing the release structure;

Figure 6 is a sectional elevational view taken along the line 6—6 of Figure 4; and Figure 7 is a top view of the elements shown in Figure 4, with parts omitted and broken away for purposes of illustration.

Referring now to Figure 1 of the drawings, there is illustrated a tractor 10 having a main frame 11 which supports a superstructure 12 adapted to position a pair of upright rails 13 on the rear of the tractor for adjustably mounting a frame 14 rotatably supporting a digging wheel 15. A power source 16 in the form of a motor or internal combustion engine mounted on the forward portion of the main frame is adapted through a transmission 17 selectively to impart motive forces to the driving wheels 19 in the form of sprockets rotatably mounted on the rearward portions of the chamber frame 22. The crawler frame is secured as by beams 20 to the main frame to form a part of the tractor chassis. It is understood that the sprockets may also be adapted to actuate separately mounted traction wheels or the like.

For driving the tracks 18 in one direction or the other, a main drive shaft 23 is connected through a universal joint 24 to the end of a traction output shaft 25 which extends outwardly from the transmission 17. The other end of the drive shaft 23 extends into a traction transmission housing 26 which, through gears (not shown) drives a rotatable stub shaft 27 having on its end portion a bevel pinion 28 disposed within a drive transmission housing 29.

A laterally disposed rotatable shaft 30 (Figure 3) supported by end bearings 31 which are carried by housing walls 32, has an annular flange 33 to which is secured by bolts 34, a bevel gear 35. The bevel gear 35 meshes with the pinion 28 thereby to drive the shaft 30 from the main shaft 23. The teeth of a spur gear 36 keyed to the shaft 30 meshes with another spur gear 37 which in turn is keyed to an intermediate driven shaft 38.

Mounted on opposite end portions of the shaft 38 are reaction brake assemblies 39 and 40 respectively, hereinafter referred to as the steering clutches, each having a series of clutch plates 41 (Figure 6) keyed to the shaft 38 for rotational movement therewith, while the interleaved clutch plates 42 are keyed to an outer brake drum 43. Each brake drum 43 has a hub portion 44 which is operatively secured by set screws 45 to a driving member in the form of a hub or sleeve 46 concentric with, but separated from, an inner shaft portion 38 by anti-friction bearing sleeve 47. The hub or sleeve 46 of each clutch is mounted on ball bearings 48 in respective housing walls 32 for rotational movement independently of the shaft 38 when the clutch plates 41 and 42 are released from driving engagement. Driving sprockets 49 and 50 are integral with the inner portions of the respective sleeves and are disposed within the housing 29. Chains 51 (Figure 3) connect the sprockets 49 and 50 to the sprockets 52 and 53 respectively, the latter sprockets being fixed to separate but aligned drive shafts 54 and 55 adjacently mounted at their inner ends by separate bearings 56 and 57 in an intermediate stanchion 58.

Another bearing 59 is provided in each side wall 32 for the outer portions of each drive shaft 54 and 55 respectively. Each drive shaft 54 and 55 extends beyond the housing for operative engagement, by interconnecting hub 60 and sleeve 61 to concentric extension shafts 62 and 63. The outer ends of the shafts 62 and 63 are journaled in a bearing 64 supported by the crawler frame 22 and have fixed thereto sprockets 65 and 66 respectively which are connected by chains 67 to sprockets 68 and 69 respectively, the latter being rotatably mounted on the crawler frame 22 and operatively connected respectively to adjacent track laying wheels 19 for actuating the same.

It is manifest from the above description that, when desired, it is possible selectively to disengage the clutch plates of one of the steering clutches, thereby only to transmit motive forces through the other clutch to the respective drive sprocket. At the same time there is actuated a braking means, later to be described, operatively associated with the disconnected steering clutch to prevent rotational movement of the associated sprocket, thus to cause turning movement of the tractor.

For purposes of disengaging one or the other of the steering clutches and applying the associated brake, there is provided in the region of the operator's seat 70 an upright shift lever 71 which is pivotally mounted near its lower end on a pin 72 (see Figure 4). Pivotally interconnecting the lower depending end portion of the shift lever 71 with the free end of a crank arm 73, which is operatively secured at its other end to a cross shaft 74, is a tie rod 75. The cross shaft 74 which is supported by brackets 76, extends across the frame 11 and has fixed at opposite ends crank arms 77 and 78 (Figure 3) which extend in opposite directions.

Since the mechanisms for effecting the desired operations in response to rocking movement of the crank arms are substantially identical, detail description will be made of one only. Such mechanism, as will hereinafter appear, are operated alternately and not conjointly depending upon the direction of rotation of the shaft 74.

Referring now to Figures 3, 4 and 7, mounted on the end of shaft 38 outwardly of the steering clutch is a booster device 79 adapted progressively in response to shift lever 71 operation to effect partial disengagement of the clutch plates 41 and 42 as well as application of the braking device, and then fully to separate the clutch plates and apply the braking device. The booster device comprises a cylindrical drum 80 adapted either loosely or tightly to be engaged by a brake band 82 which has the usual brake lining 81. Band adjustment is effected by actuation of a pair of rocker arms 83 and 84, each having at its outer end an adjustable pin 85 which is fixed by welding 85a to an end of the metal strip 82.

A pair of stub shafts 86 and 87 are keyed in socket portions 88 integral with and projecting outwardly from a carrier ring 89, and provide a pivotal mounting for intermediate portions of the rocker arms respectively. Links 92 and 92a are pivoted to the opposite end portions of the rocker arms respectively and are pivotally interconnected at their free ends with one end of a link 93, thereby forming a toggle. Adjustment in toggle position may be effected by means of a set screw 91 in operative engagement with a tail 90 which forms a part of each rocker arm and rests on the surface of the booster drum. The other end of the link 93 is pivotally connected to an ear 94 on one of the sleeve sections 95, the sleeve sections 95 being respectively mounted for rotational movement on the stub shafts. The sleeve section 95 having the ear 94 forms one end of a U-shaped lever 96 operatively connected by a slip joint to the free end of the crank arm 77. In the assembled relation, nuts 101 threadably engage the outer end of each stub shaft 86 and 87 and secure the rocker arms and sleeve sections 95 thereon.

The slip joint is formed by a tie rod 97 having one end slidably disposed in a sleeve member 98 which is pivoted to the free end of the crank arm 77 in a manner positively to transmit rearward arm movement to a threadably engaged bent link 99, the latter being pivotally secured to the free end of the U-shaped lever 96. The tie rod 97 is constantly urged toward its limit of movement by a coil spring 100 encircling the tie rod between the sleeve member 98 and the link 99.

The booster drum 80 is formed integrally with a hub member 102 (Figure 6) that slidably fits over an end portion of the shaft 38 and is positioned thereon by roller bearing unit 103 seated in an annular groove 104 in the hub member, an end cap 105 secured by screws 106 to the end of the shaft 38 engages the opposite side of the roller bearing unit. The carrier ring 89 is mounted on the hub member 102 by a suitable bearing 107.

Axially slidable on an annular series of rods 108, which are screw-threadedly connected to the outer clutch plate 41a, is an annular disc plate 109 having a hub 109a which is movably interposed between the hub member 102 and a pair of bosses 110 integral therewith. The hub 109a is grooved in a manner to form a pair of outwardly inclined cam surfaces 111 diverging from a relatively straight central section 112, the cam surfaces terminating as abutment walls 113 which extends outwardly to the end of the hub portion. Operable within the grooved portion is a pin 114 on which is rotatably mounted in a roller 114a, the pin being mounted in a suitable socket in the hub member 102 and the bosses 110. It will be apparent that the booster drum 80 is rotated by the cam plate 109 through the frictional engagement between cam and the cam roller.

A coil spring 115 has one end seated in a flanged cup 116 disposed in registered openings 117 through the clutch plates 41 in an area below the plates 42, which are keyed for relative rotational movement to the outer drum 43. The other end of the spring bears against the disc plate 109 and constantly urges the clutch plate 42b and disc 109 toward the left of Figure 6, thus normally to dispose the roller 114a in the central area of the cam groove and urges the clutch plates to clutching position. The disc plate engages the head 118 of a rod 119 which slidably extends through an aperture in the disc plate, the end of the rod being secured to the innermost clutch plate 42b so that in the normal position, the clutch plates are urged to their gripping or clutching position. An annular ring 120 secured by set screws to the shaft 38 militates against relative axial shifting movement of the plates 42 when in the assembled position. It is expedient for balance to provide more than one spring 115 and rod 119 assembly and for purposes of construction, it is convenient to dispose the rod concentrically of the coil spring and slidably to extend it through an aperture in the base of the flanged cup 116.

In this manner, when a braking force is applied to the booster drum 80, the roller 114a rolls up one or the other of the cam surfaces 111, thereby displacing the disc plate 109 axially inwardly. As a result, inward axial movement of the disc plate 109 compresses the coil springs 115 causing release of the clutch plates from each other.

Although the coil spring 115 is further tensioned, inner shifting movement of the outer clutch plate 41a is prevented by a suitable stop on the shaft 38, and accordingly the inward movement of the plate 109 eliminates the transmission of the spring force from the plate 109 to the head 108 and to the clutch plate 42b.

In the preferred embodiment illustrated, the just mentioned suitable stop comprises an outwardly facing shoulder 120a on the shaft 38 against which the ring 120 abuts, the ring 120 being welded to the outer clutch plate 41a.

Depending from the carrier ring 89 is an integral lever arm 121 to the lower end of which is pivoted a tie rod 122. The other end of the tie rod 122 is pivoted to the end of a lever arm 123 mounted on a bearing 124 for rocking movement in a horizontal plane.

The lever arm 123 is urged to its normal position by a coil spring 125 (Figure 5), which is disposed between a pair of discs 126 and 127, the discs being slidable longitudinally in a cylindrical housing 128. The housing 128 has end wall 129 and the other end is closed by a plug 130, which is secured by set screws in the housing, the housing being anchored to the tractor frame by a bracket 131. A rod 132 pivotally engages an intermediate portion of the lever arm 123 and has an extended screw-threaded end portion, which projects longitudinally through the housing. A sleeve 134 on the rod 132 is slidable through an opening in the end wall 129 and abuts at one end against the disc 126, the opposite end engaging a nut 133 for holding the sleeve in adjusted position. Similarly another sleeve 135 slidable through an aperture in the plug 130 bears against the disc 127 and is adjustably positioned by a nut 133' on the rod 132.

Referring now to Figures 6 and 7, the steering brake is actuated in response to rocking movement of the lever arm 123 in one direction or the other. For this purpose there is disposed on the outer surface of the brake drum 43, to which the clutch plates 42 are keyed, a pair of substantially semi-circular brake bands 136 having a brake lining 138. To the upper edge portions of the brake bands 136 are welded box-like members 140 and 141 respectively (Figure 4), these members having substantially aligned apertures adapted slidably to receive a bolt 142 having a nut 144, a coil spring 143 on the bolt urging the members apart. To the lower ends of the brake bands 136 are welded pairs of horizontally spaced plates formed with parallelly arranged bars 145 and 146, 147 and 148 respectively, all terminally positioned adjacent each other by means of a pin 149 securely positioned by a bracket 150 to the tractor frame in radial alignment with the center of the brake drum.

Pins 151 and 152 extend laterally from spaced portions of an arm 153, which is disposed between and in parallel relation to the bars 145, 146, 147 and 148 and is pivoted at one end to an intermediate portion of the lever arm 123. Slots in the bars 145, 146, 147 and 148 respectively are arranged in a manner to cooperate with the pins 151 and 152 to effect the desired movement of the brake bands 136 in response to the rocking movement of the lever arm 123. For example, the ends of slots 155 and 155a (Figure 7) formed in the bars 145 and 146 respectively are engaged upon movement of the pin 151 to effect concomitant shifting movement of these bars in one direction, but the slots enable the pin to be moved independently in the opposite direction. The ends of other slots 156 and 156a in the same bars are engaged by the mounting pin 149 and permit the bars to be shifted in one direction but militate against shifting movement in the opposite direction. Similarly, slots 157 and 158 in each bar 147 and 148 (Figure 7) are arranged in cooperation with the pin 152 to effect shifting movement in one direction but to militate against shifting movement of the bars in the opposite direction. The arm 153 is provided, as illustrated in Figure 7, with a central opening 153a preventing interference with the shaft 149 during movement of the arm 153.

It is thus apparent from the above description that, when the bars 145 and 146 are shifted together in one direction, responsive to upward swinging movement of the lever arm 123 (Figure 7), the associated brake band 136 is drawn more tightly about the drum 43. Thus there is effected a braking action upon the brake drum 43. Similarly, when the bars 147 and 148 are shifted downwardly (Figure 7), the respective band 136 is tightened upon the drum 43. When the forces urging the lever arm 123 in one direction or the other are relaxed, the centering spring 125 urges the return of the arm to its normal position, thereby enabling the release of the drum by the brake band aided by the action of the coil spring 143.

From the above description, it will be apparent that steering of the tractor is controlled by the single hand lever 71, which when rocked in one direction either stops or retards the movement of one of the crawlers 18 without affecting the operation or movement of the other crawler. It will be seen in Figure 4 that rocking of the lever 71 in one direction or the other causes one brake band 82 to be tightened or applied to its booster drum 80, while the other brake band 82 is unaffected or free of its booster drum. For example, movement of the lever 71 to the left of Figure 4, causes the brake band 82 controlled by the rock arm 77 to be applied, but due to the slip joint, which includes the rod 97 and sleeve or socket member 98, and due also to the positioning of the arm 78 relative to the arm 77, the brake band controlled by the rock arm 78 is unaffected.

Thus there is imparted a drag on the booster drum 80, which not only causes relative movement between the booster drum and the cam carrying disc 109, but also causes the carrier ring 89 and associated parts to rotate with the drum 80. At first, the centering spring 125 associated with the lever arm 123 partially resists the rotational movement of the carrier ring 89 until such differential movement has occurred between the booster drum 80 and the cam disc as to cause the roller 114a to roll up the cam 111 and engage the abutment 113.

During movement of the roller 114a along the cam track 111, it will be manifest that the associated clutch is partially released, the release spring 125 is partially compressed, and the brake band 136 is partially applied. It is not until the roller 114a has traveled to the high end of the cam 111 that the clutch is fully released and the spring 125 is further compressed and sufficient movement of the lever 123 is effected fully to apply the brake through the arm 153 and associated parts.

When the roller 114a has effected complete release of the clutch, relative rotation between the booster drum 80 and shaft 38 is prevented and the resulting forces urging rotation of the carrier ring 89 with the shaft 38 become sufficient completely to overcome the static forces of the spring 125. Thus the lever arm 121 is rocked concomitantly to rock the lever arm 123 in a direction further to compress the spring 125.

As described, when the lever arm 123 is rocked downwardly (Figure 7), the arm 153 moves downwardly to effect shifting movement of the bars 145 and 146 therewith. This causes the respective brake bands 136 to tighten against the drum 43 to resist the turning of the drum, the clutch plates 42 having been already disengaged from the plates 41 associated with the shaft 38. Thus the clutch is released before the brakes are fully applied, thereby greatly to facilitate turning movement of the tractor.

It is understood that shifting movement of the control lever 71 in the forward direction (Figure 1) effects movement of the rods 97 opposite to that above described, thus, in a similar manner, only to disengage the steering clutch plates of the clutch 40 and subsequently to actuate the associated brake band, thereby to militate against rotational driving movement of the sprocket 50 while continuing the operation independently of the sprocket 49. In this manner the crawler connected to the sprocket 65 is driven while the crawler associated with sprocket 66 is braked, causing the tractor to turn sharply to the left.

It will be readily understood from the above description that I have produced in a tractor of the type described a new and improved relation of parts employing a booster mechanism interposed between the tractor control lever and the tractor driving and braking means for effecting the progression of operations; first partially disengaging the driving clutch; partially applying the main tractor brake; fully disengaging the driving clutch; and then fully applying the braking means to effect the desired steering movement. It is manifest that the booster mechanism is so constructed and arranged as to be actuated in the main by the main driving shaft on which it is mounted, only such externally applied forces being necessary as to initiate the operation of the booster brakes. Thus, in response to a minimum of effort on the part of the operator, complete disengagement of the driving clutch and full application of the braking means are effected. Static force means are also provided for the return of the parts to their normal position in response to their release by the operator.

It is to be understood that numerous changes in the details of construction, arrangement and operation may be effected without departing from the spirit of the invention especially as defined in the appended claims.

What I claim is:

1. In a tractor having a pair of traction units and a steering clutch and brake for each unit, operating mechanism for each steering brake and clutch comprising a booster drum adjacent the clutch, a clutch release member rotatable with the clutch and disposed adjacent said booster drum, each clutch release member being shiftable axially to release the adjacent clutch, means providing a connection between said clutch release member and the adjacent booster drum for causing said drum to rotate therewith and including cam means so that a drag imposed upon said booster drum causes clutch releasing movement of said release member, a booster drum brake for imposing a drag on said booster drum, a rotatable carrier adjacent said booster drum, booster drum brake operating mechanism on said carrier whereby application of said booster drum brake imparts movement to said carrier, and link and lever mechanism operatively connecting said carrier to the respective steering brake thereby to apply same in response to such carrier movement.

2. A tractor as claimed in claim 1, comprising a spring associated with said link and lever mechanism for resisting full application of the steering brake until the respective clutch is fully released.

3. In a tractor having a pair of traction units, a spring loaded steering clutch and a brake for each unit, operating mechanism for each clutch and brake set comprising a clutch release member rotatable with and shiftable axially for releasing the respective clutch, a hub on said clutch release member, a booster drum adjacent each clutch release member, a cam surface on said hub, a roller on said booster drum engaging said cam surface, said cam surface being retained in engagement with said roller by the clutch springs, a brake for each booster drum for causing differential rotation between the drum and release member thereby to enable the cooperation of said cam surface and said roller to shift said release member for releasing the respective clutch, a rotary carrier adjacent each booster drum, booster drum brake operating mechanism on said carrier, a lever arm on each carrier movable therewith, means providing an operative connection between each lever and the respective steering brake, and a spring device forming part of said connecting means and resisting operation thereof so that partial release of a clutch enables partial application of the respective steering brake and upon complete release of the clutch, full application of the steering brake is effected.

4. In a tractor steering mechanism, a driven shaft, a member mounted on said shaft in coaxial relation therewith for rotation relative thereto and adapted to be connected to a traction unit of said tractor to control the operation thereof, a plurality of clutch elements concentric with said shaft and including one element connected to said member for rotation therewith and a pair of elements disposed at opposite sides of and movable relative to said one element between engaged and released positions and connected to said shaft for rotation therewith, a clutch release disc mounted on one of said pair of elements for rotation therewith and disposed coaxially of said shaft, means mounted on the other of said pair of elements and engageable with said disc for limiting axial movement of said disc in one direction, spring means acting between said disc and said one of said pair of elements to urge said disc in said one direction and exert a pressure yieldably holding said clutch elements in said engaged position, a booster drum mounted on said shaft for free rotation relative thereto, means preventing movement of said booster drum axially of said shaft, co-operating means on said booster drum and said disc effective throughout a predetermined range of angular movement of said drum relative to said disc to cam said disc in the opposite direction to increase the loading of said spring and relieve said pressure and effective at the end of said predetermined range of angular movement to provide a positive driving connection between said disc and said booster drum, a carrier disposed coaxially with said shaft, a booster brake adapted to engage said booster drum, a main brake adapted to engage said member, booster brake operating means mounted on said carrier whereby upon the applying of said booster brake by said operating means the latter transmits forces directly to the carrier urging the carrier to rotate about the axis of said shaft, and means connecting said carrier to said main brake and effective upon said rotation of said carrier to apply said main brake.

5. In a tractor steering mechanism, a driven shaft, a member mounted on said shaft in coaxial relation therewith for rotation relative thereto and adapted to be connected to a traction unit of said tractor to control the operation thereof, clutch means operable to connect said shaft and said member and including a clutch release disc movable axially of said shaft between a first position in which said clutch means is engaged and a second position in which said clutch means is released, a booster drum mounted on said shaft for free rotation relative thereto, means preventing movement of said booster drum axially of said shaft, co-operating means on said booster drum and said disc effective throughout a predetermined range of angular movement of said drum relative to said disc to cam said disc from said first position to said second position and effective at the end of said predetermined range of angular movement to provide a positive driving connection between said disc and said booster drum, a carrier disposed coaxially with said shaft, a booster brake adapted to engage said booster drum, a main brake adapted to engage said member, booster brake operating means mounted on said carrier whereby upon the applying of said booster brake by said operating means the latter transmits forces directly to the carrier urging the carrier to rotate about the axis of said shaft, and means connecting said carrier to said main brake and effective upon said rotation of said carrier to apply said main brake.

6. In a tractor steering mechanism, a driven shaft, a member mounted on said shaft in coaxial relation therewith for rotation relative thereto and adapted to be connected to a traction unit of said tractor to control the operation thereof, clutch means operable to connect said shaft and said member and including a clutch release disc movable axially of said shaft between a first position in which said clutch means is engaged and a second position in which said clutch means is released, a booster drum mounted on said shaft for free rotation relative thereto, means preventing movement of said booster drum axially of said shaft, co-operating means on said booster drum and said disc effective throughout a predetermined range of angular movement of said drum relative to said disc to cam said disc from said first position to said second position and effective at the end of said predetermined range of angular movement to provide a positive driving connection between said disc and said booster drum, a carrier disposed coaxially with said shaft, a booster brake adapted to engage said booster drum, a main brake adapted to engage said member, booster brake operating means mounted on said carrier whereby upon the applying of said booster brake by said operating means the latter transmits forces directly to the carrier urging the carrier to rotate about the axis of said shaft, means connecting said carrier to said main brake and effective upon said rotation of said carrier to apply said main brake, and means yieldably opposing said rotation of said carrier to prevent full application of said main brake until said positive driving connection has been established.

7. The combination as defined in claim 5, wherein said main brake comprises a pair of semicircular bands interconnected at one end and wherein said last named means is effective independently of the direction of rotation of said carrier and includes first and second plates connected respectively to the free ends of said bands and having overlapping portions having overlapping slots, a fixed pin extending through said slots and simultaneously engaging said plates at one end of each of said overlapping slots to prevent movement of either of said free ends in a direction away from the other while permitting movement of either of said free ends toward the other, and an arm having a pin and slot connection with each of said plates effective upon movement in either direction to move one of said free ends toward the other and apply said main brake.

ROBERT N. BENNETT.

References Cited in the file of this patent

UNITED STATES PATENTS

| Number | Name | Date |
|---|---|---|
| 1,184,007 | Norelius | May 23, 1916 |
| 1,436,604 | Rackham | Nov. 21, 1922 |
| 1,474,742 | Turnbull | Nov. 20, 1923 |
| 1,520,432 | Norelius | Dec. 23, 1924 |
| 2,230,339 | Shaw | Feb. 4, 1941 |
| 2,449,893 | Gilman | Sept. 21, 1948 |

FOREIGN PATENTS

| Number | Country | Date |
|---|---|---|
| 869,803 | France | Feb. 20, 1942 |